(12) United States Patent
Nakano et al.

(10) Patent No.: US 8,219,577 B2
(45) Date of Patent: Jul. 10, 2012

(54) APPARATUS AND METHOD PRODUCT FOR PRESENTING RECOMMENDED INFORMATION

(75) Inventors: Wataru Nakano, Kanagawa-ken (JP); Masaru Suzuki, Kanagawa-ken (JP); Hideki Tsutsui, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 441 days.

(21) Appl. No.: 12/437,590

(22) Filed: May 8, 2009

(65) Prior Publication Data

US 2010/0076991 A1    Mar. 25, 2010

(30) Foreign Application Priority Data

Sep. 9, 2008    (JP) ................................ 2008-230742

(51) Int. Cl.
*G06F 17/30* (2006.01)
(52) U.S. Cl. ..................................... 707/767
(58) Field of Classification Search ......... 707/765–768, 707/751
See application file for complete search history.

(56) References Cited

U.S. PATENT DOCUMENTS

| | | | | |
|---|---|---|---|---|
| 6,446,065 B1 * | 9/2002 | Nishioka et al. | ...................... | 1/1 |
| 7,367,043 B2 * | 4/2008 | Dudkiewicz et al. | ......... | 725/138 |
| 7,657,906 B2 * | 2/2010 | Icho et al. | ....................... | 725/45 |
| 7,743,059 B2 * | 6/2010 | Chan et al. | ..................... | 707/737 |
| 2002/0157096 A1 * | 10/2002 | Hane et al. | ....................... | 725/46 |
| 2003/0220922 A1 | 11/2003 | Yamamoto et al. | | |
| 2006/0026013 A1 * | 2/2006 | Kraft | ................................ | 705/1 |

OTHER PUBLICATIONS

Google AdSense, "Welcome to AdSense," http://www.google.com/adsense/login/en_US/?hl=en_US, Sep. 26, 2008.

* cited by examiner

*Primary Examiner* — Thu-Nguyet Le
(74) *Attorney, Agent, or Firm* — Turocy & Watson, LLP

(57) ABSTRACT

A recommended information presentation apparatus, including a display unit which displays text data, an extraction unit which extracts keyword candidates from the text data, a storage unit which stores semantic attributes of the keyword candidates, semantic attribute rules which contain scoring criteria for semantic attributes, descriptive phrases describing the keyword candidates and descriptive phrase rules which contain scoring criteria for descriptive phrases. The scores of the keyword candidates are calculated by a selection unit based on the semantic attribute rules and descriptive phrase rules and the highest scoring keyword candidates are selected as keywords. The selected keyword is used to search an information database by a search unit which also receives the search results which are displayed on the display unit by a control unit as recommended information with regards to the text information.

18 Claims, 22 Drawing Sheets

Semantic Attribute Rule

| Semantic Attribute | Score |
|---|---|
| People Name | 10 |
| Animal | 15 |
| Place Name | 8 |
| Construction | 4 |
| History | 4 |
| Verb | 2 |

FIG. 8A

Descriptive Phrase Rule

| Descriptive Phrase | Score |
|---|---|
| Long | 10 |
| Rich | 10 |
| Popular | 10 |
| Awe-inspiring | 2 |
| Great | 3 |

FIG. 8B

Document Type Rule

| Document Type | Semantic Attribute | Score |
|---|---|---|
| News | People Name | 5 |
| | Place Name | -3 |
| Tourist Spot | People Name | -3 |
| | Place Name | 5 |
| Recipe | People Name | -5 |
| | Place Name | -5 |
| | Food Item | 5 |

FIG. 8C

| Order | Keyword | Category |
|---|---|---|
| 1st | Kamakura | Travel |
| 2nd | Kamakura Shogunate | Documentary |
| 3rd | Kamakura Great Buddha | Documentary |
| ... | ... | ... |

FIG. 13

| Document Type | Semantic Attribute | Video Category |
|---|---|---|
| News | People Name | News |
| News | Place Name | News |
| Tourist Spot | History | Documentary |
| Tourist Spot | Place Name | Travel |
| Recipe | People Name | Restaurant |

FIG. 14

| Order | Keyword Candidate | Score | Expression Format |
|---|---|---|---|
| 1st | Kamakura | 30 | Video |
| 2nd | Kamakura Shogunate | 25 | Text |
| 3rd | Kamakura Great Buddha | 10 | Still Image |

FIG. 19

| Suitable Expression Format | Document Type | Surrounding Phrases | Keyword Semantic Attribute |
|---|---|---|---|
| Video | Tourist Spot | Therapeutic | Place Name |
| Video | Recipe | Method | Food Name |
| Still Image | Recipe | Delicious | Food Name |
| Still Image | News | - | People Name |
| Still Image | Tourist Spot | Awe-inspiring | Construction |
| Text (Dictionary) | Tourist Spot | Historical | History |

FIG. 20

APPARATUS AND METHOD PRODUCT FOR PRESENTING RECOMMENDED INFORMATION

CROSS-REFERENCE TO RELATED APPLICATIONS

This application is based upon and claims the benefit of priority from the prior Japanese Patent Application No. 2008-230742 filed on Sep. 9, 2008; the entire contents of which are incorporated herein by reference.

TECHNICAL FIELD

The present invention relates to a recommended information presentation apparatus and method for the presentation of the recommended information related to the contents of the webpage being viewed.

BACKGROUND

It has become common for web advertisement links to be displayed within the webpage being viewed as seen for example in the reference, Google® AdSense. The user if desired clicks on the links to access the related advertisement or purchase the product being advertised. Through the use of this technology, the links displayed are not limited to just advertisements. Instead, other information like articles and related webpages can also be displayed as information relating to the webpage.

However, as the relevancy of the recommended information to the webpage content is not determined, there are times when information with very low relevance is recommended to the user. Instead of supplying the user with useful, relevant information, the user is instead inconvenienced with information that is not needed. Also, as the recommended information being displayed is limited to a textual format, the form of expression for the related information may not be suitable. As such, the user is not able to obtain information in an effective and timely manner.

SUMMARY

To address the above described problems, the present invention seeks to provide an apparatus and method to effectively present recommended information for the user to peruse.

According to an aspect of the present invention, there is provided an apparatus of presenting recommended information, the apparatus including:
a display unit which displays text data;
an extraction unit which extracts keyword candidates from the text data;
a storage unit which stores semantic attributes of the keyword candidates, semantic attribute rules which contain scoring criteria for semantic attributes, descriptive phrases describing the keyword candidates and descriptive phrase rules which contain scoring criteria for descriptive phrases;
a selection unit which calculates the scores of the keyword candidates based on the semantic attribute rules and descriptive phrase rules and selects the highest scoring keyword candidates as keywords;
a search unit which searches an information database with the selected keyword and receives the search results;
a control unit which displays the search results on the display unit as recommended information with regards to the text information.

According to another aspect of the present invention, there is provided recommended information presentation method involving: displaying text data on a display; extracting keyword candidates from the text data; storing semantic attributes of the keyword candidates, semantic attribute rules which contain scoring criteria for semantic attributes, descriptive phrases describing the keyword candidates, and descriptive phrase rules which contain scoring criteria for descriptive phrases in a storage unit; calculating the scores of the keyword candidates based on the semantic attribute rules and descriptive phrase rules to select a selected keyword which has a highest score among the keyword candidates; searching an information database with the selected keyword and receiving search results; and displaying the search results on the display unit as recommended information with regards to the text information on a display.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following description when considered in conjunction with the drawings.

BRIEF DESCRIPTION OF THE DRAWINGS

The accompanying drawings, which are incorporated in and constitute a part of the specifications, illustrate embodiments of the invention, and together with the general description given above and the detailed description of the embodiments given below, serve to explain the principles of the invention.

FIGS. 8A, 8B and 8C are diagrams illustrating the scoring rules stored in the Keyword Candidate Selection Knowledge Unit 19.

FIG. 13 is a diagram illustrating an example where the video category is included in the data for output by the Search Query Creation Unit 21 in S107.

FIG. 14 is a diagram illustrating the video category selection rules stored in the Search Query Creation Knowledge Unit 22.

FIG. 19 is a diagram illustrating an example where the expression format is included in the data for output by the Suitable Keyword Expression Format Determination Unit 25.

FIG. 20 is a diagram illustrating suitable keyword expression format determination rules stored in the Suitable Keyword Expression Format Determination Knowledge Unit 26.

DETAILED DESCRIPTION

The embodiment of the present invention is described below with reference to the attached drawings.

Figure 1:
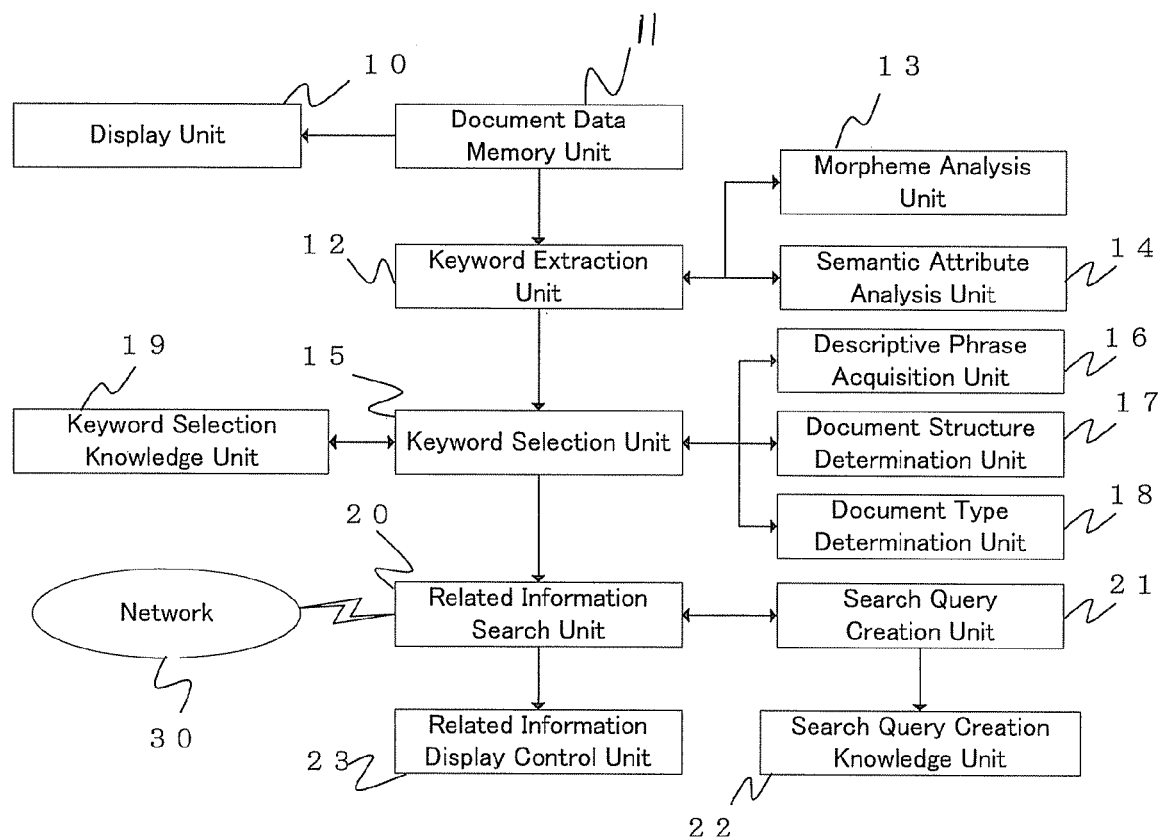
FIG. 1 is a functional block diagram illustrating a first embodiment of the recommended information presentation apparatus of the present invention.

FIG. 1 shows the actual configuration of the recommended information presentation apparatus according to a first embodiment of the present invention, in which recommended information related to the document displayed, is provided automatically to the user. As shown in the diagram, the recommended information presentation apparatus includes a display unit 10 for the display of the document being viewed, a document data memory unit 11 for the storage of document data, a keyword candidate extraction unit 12 which can extract keyword candidates from the documents being viewed, a morpheme analysis unit 13 which can carry out morpheme analysis on the extracted keyword candidates and a semantic attribute analysis unit 14 which can carry out semantic attribute analysis on the extracted keyword candidates.

The recommended information presentation apparatus also includes a keyword candidate selection unit 15 which can select the keywords after scoring them, a descriptive phrase acquisition unit 16 which can acquire the descriptive phrases surrounding the keyword candidates, a document structure determination unit 17 which can determine the document structure, a document type determination unit 18 which can determine the document type and a keyword candidate selection knowledge unit 19 which can store the rules by which the keyword candidates are scored and selected. A related information search unit 20 searches for information related to the keywords from an externally connected network 30. A search query creation unit 21 creates the query for the search based on the rules stored in a search query creation knowledge unit 22. A related information display control unit 23 then displays the search results generated on display unit 10.

The display unit 10 as shown in FIG. 1 has a display window (not shown) displaying the text being viewed currently. Examples of text data include web pages, emails, digital documents, digital books, magazines, and so on. Web browsers, mail software, editing software and document viewing software are examples of windows being displayed on display unit 10.

The document data memory unit 11 stores the document data as well as information on the structure of the document.

The keyword candidate extraction unit 12 first acquires the document data of the document being displayed on display unit 10 from document data memory unit 11. Keyword candidates are then extracted from the document so as to enable the searching of related information. The data acquisition can start as soon as text is displayed on display unit 10 or it can begin after the display window has been deemed active. Another alternative is to start the data acquisition if the display window has been deemed active for a certain predetermined period of time. The measurement of the active time period can be carried out by display unit 10 or keyword candidate extraction unit 12. Although not shown in FIG. 1, it is also possible for a document display time check unit, which measures the display time, to be included. The keyword candidate extraction process is carried out by dividing the document data into multiple character strings and narrowing the document data down by filtering. The subdividing of the document data into multiple character strings can be carried out by having the morpheme analysis unit 13 carry out morpheme analysis on the document or by utilizing the spaces in between words. When narrowing down the character strings, the semantic attribute analysis unit attaches semantic attributes to the character strings and special semantic attributes are picked out as keyword candidates.

The keyword candidate selection unit 15 evaluates the keyword candidates selected by the keyword candidate extraction unit 12 and decides if there is a need to search for and display relevant information related to the keyword candidate. The evaluation is carried out using any suitable means such as using a scoring system. The scores are obtained by using the scores for the descriptive phrases surrounding the keyword candidate as obtained by the descriptive phrase acquisition unit 16 or the document structure as obtained by the document structure determination unit 17 or the document type as obtained by the document type determination unit 18. The evaluation results are then compared with the rules stored in the keyword candidate selection knowledge unit 19 and scored accordingly. For example, in the case of information obtained from a webpage displayed on a web browser, the information may be deemed as a top page or a normal information page. In terms of document type, the document may be taken to be a critique or an introduction site.

In addition to text document links, it is also possible to judge if the selected expression format for the related links is suitable by comparing it with the document structure. Other related information can include the likes of audio data, still images, mail documents, programs, etc. In terms of the evaluation, it is possible for scores to be accorded by determining the number of occurrences for the keyword candidates. The evaluation and the scoring process of the keyword candidate extraction unit 15 will be explained later.

The keyword candidate selection unit 15 also selects keywords to be used for search queries based on the scores accorded. Selection is based on the scores wherein a certain determined number of entries from the top or by using a certain predetermined score and selecting all keyword candidates with scores higher than the fixed score. Also, as will be explained later, it is also possible to change the selection process in accordance to the document structure and type.

The related information search unit 20 carries out a search on the keywords selected by the keyword candidate selection unit 15 and obtains the search results. One method of searching can be to enter the keyword as it is into the search engine. Another method can be to have search query creation unit 21 append information to the selected keyword in order to create a search query. An example of such a query is attaching the descriptive phrases acquired by the descriptive phrase acquisition unit 16 to the selected keyword. Other examples include using the document structure determined by the document structure determination unit 17 or the document type determined by the document type determination unit to check if the expression format of the related information is suitable. The search query creation rules are stored in the search query creation knowledge unit 22.

The related information display control unit 23 displays the related information found by the related information search unit 20 on the display unit 10. The search results can be displayed as is or in summary form in some sort of index format before display.

The first embodiment of the present invention is now described in further detail.

Figure 2:
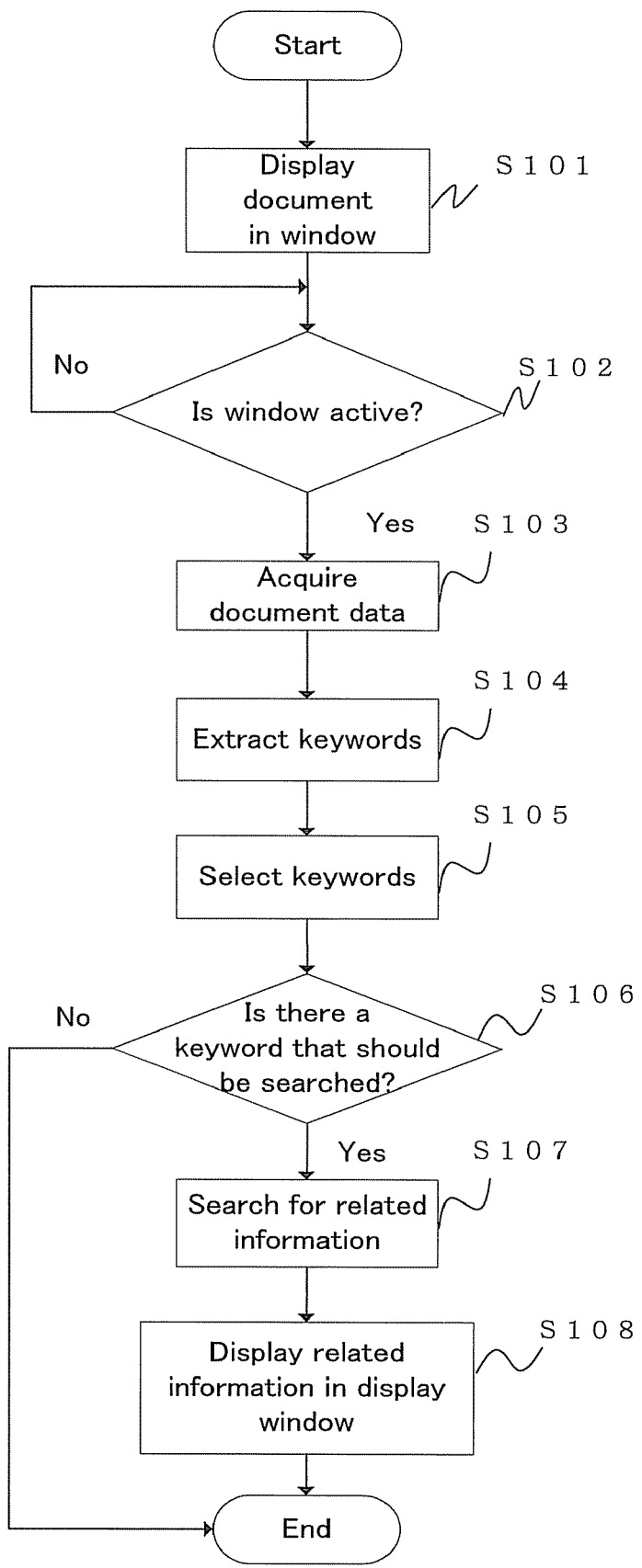
FIG. 2 is a diagram illustrating the overall flow of the recommended information presentation apparatus shown in FIG. 1.

In this example, when a webpage with text content is displayed in the web browser, video content related to the contents of the webpage is displayed as related information. FIG. 2 is a diagram illustrating the overall process flow of the first embodiment.

A webpage with text content is first displayed in display unit 10 (S101). The keyword candidate extraction unit can then check on the status of the window as well as display unit 10 to determine if the window is in active mode (S102). If the window is found to be inactive, then the process can be looped back to check the window and display unit status again. If the window is found to be active, then the keyword candidate extraction unit retrieves the document file from the document data memory unit 11 (S103). The keyword candidate extraction unit 12 then extracts the keyword candidates to be used as search keywords from the document data (S104). The extracted keywords are then evaluated and search keywords are selected by keyword candidate selection unit 15 (S105). After all keyword candidates are evaluated, the keyword candidate selection unit 15 checks if there are any keywords for which a search for related information has to be initiated (S106). If no such keywords are found, then the process is ended. However, if such a keyword is found, then a search for related information is carried out by the related information search unit 20 (S107). The related information display control unit 23 can then display the search results on display unit 10 as related information (S108).

Figure 3:
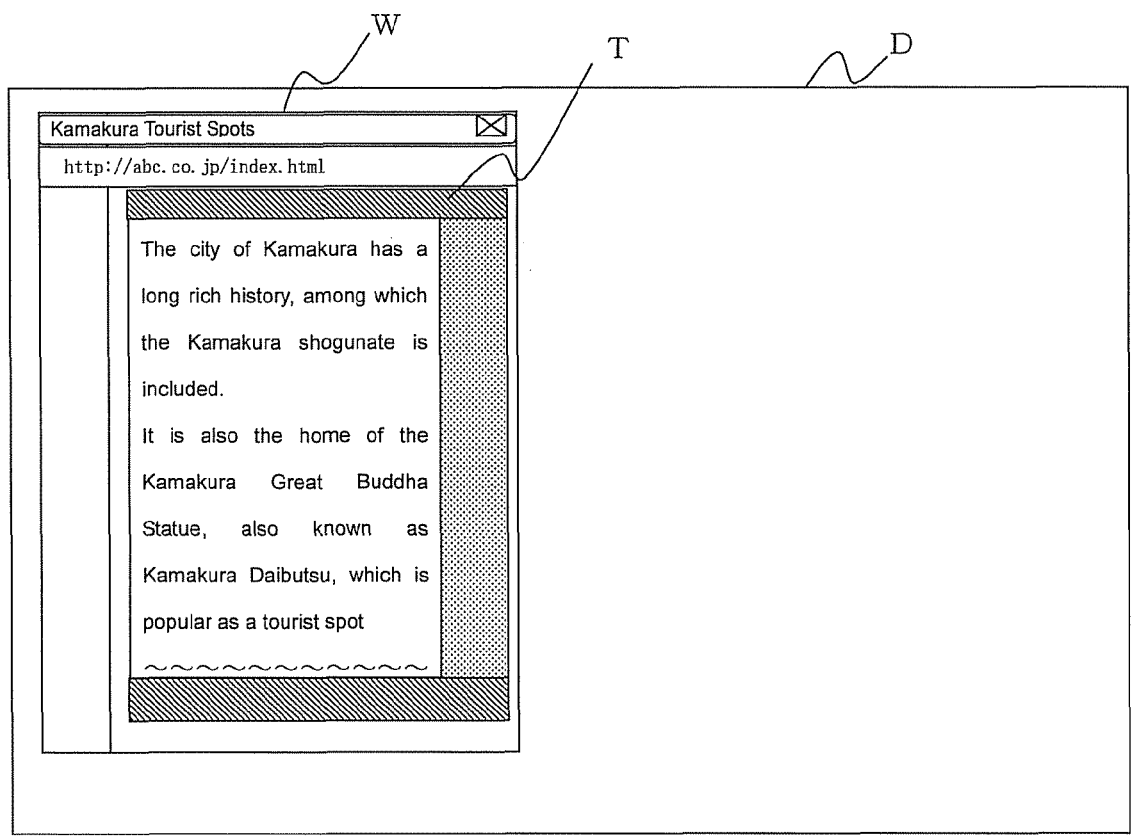
FIG. 3 is a diagram illustrating the image displayed by S101 of the flowchart shown in FIG. 2.

An example of a webpage being displayed in the display unit 10 is shown in FIG. 3. In this example, the display unit 10 of the client terminal is shown as D, wherein the current window being displayed is depicted as W. T is the webpage being displayed in window W.

Figure 4:
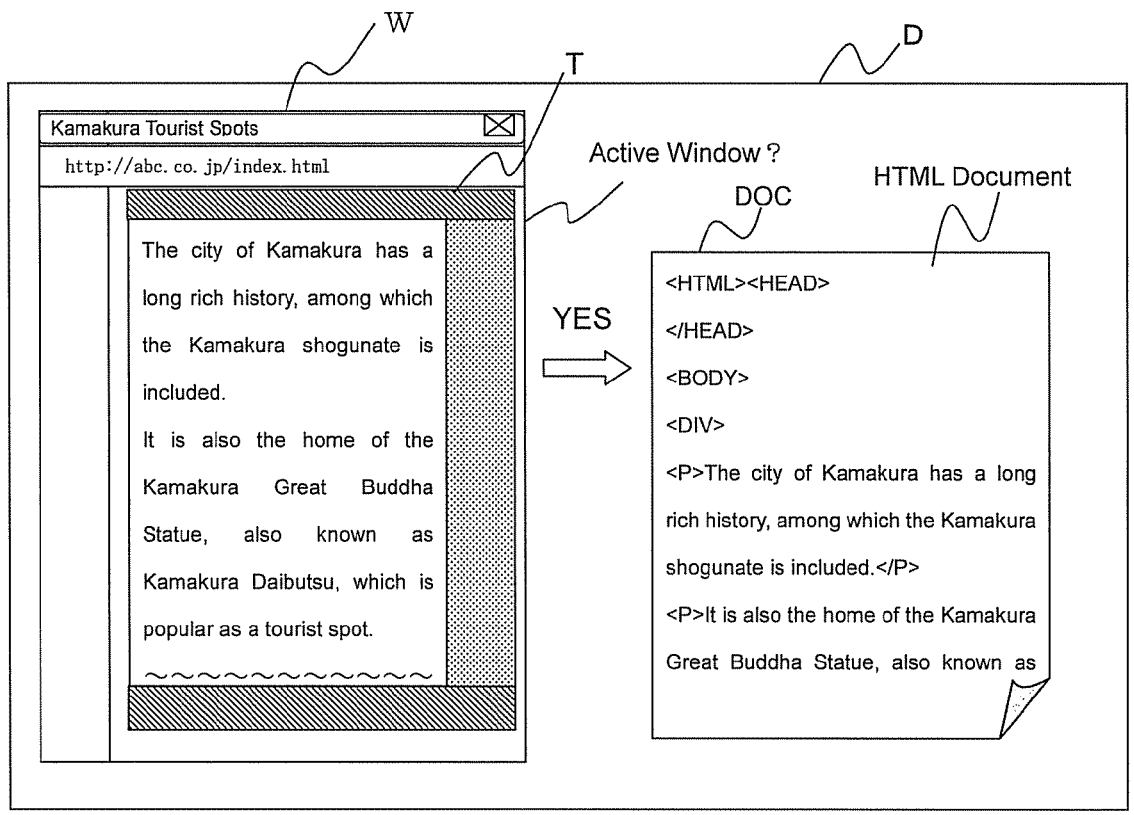
FIG. 4 is a diagram illustrating the image displayed after the HTML document has been extracted by S102 and S103 of the flowchart shown in FIG. 2.

The document date obtained from the webpage displayed is shown in FIG. 4 as DOC. In this case, DOC is a HTML document contained within HTML tags. Examples of HTML tags include <BODY>, <P>, etc. In this case, <P>The city of Kamakura has a long, rich history, among which the Kamakura Shogunate is included</P><P>It is also the home of the Kamakura Great Buddha Statue, also known as . . . </P> are parts of the article on the webpage. The text encompassed within <P> and </P> constitute one paragraph.

Next, act S104 of FIG. 2 is explained in greater detail.

Figure 5:
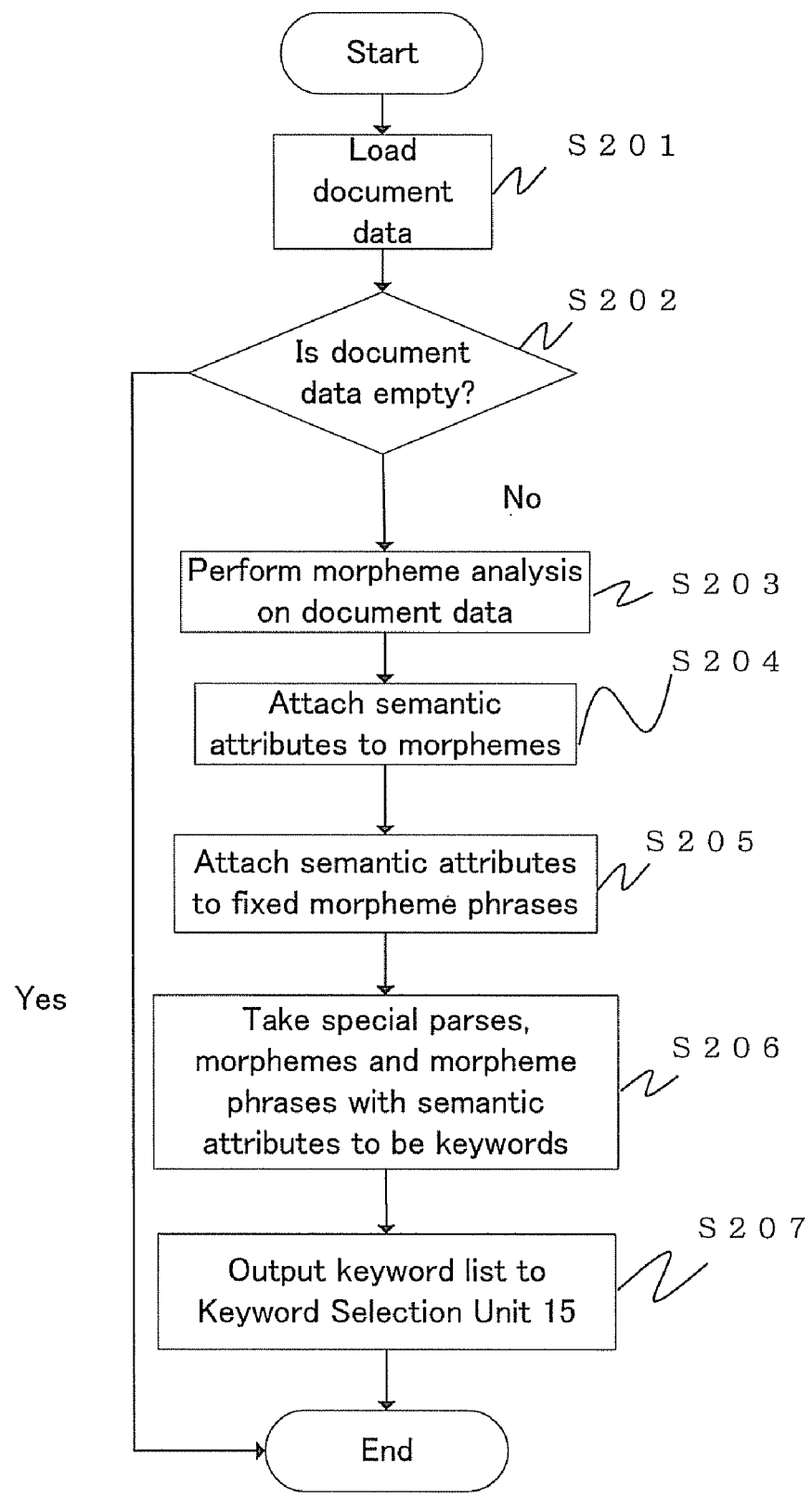
FIG. 5 is a diagram illustrating the flow of the keyword candidate extraction process carried out by the Keyword Candidate Extraction Unit 12 in S104.

In FIG. 5, demonstrates execution of the keyword candidate extraction process. First, the document data displayed in the active window is loaded (S201). A check is then performed on the document data to determine if it is empty or not (S202). If the document data is found to be empty, then the process is immediately ended. If the document data is not empty, then the document data is deemed to contain character strings. As such, morpheme analysis is then performed on the document data to obtain morphemes, morpheme phrases and parses (S203). Next, semantic attribute analysis of the morphemes is carried out to attach semantic attributes to them (S204). Semantic attribute analysis of the fixed morpheme phrases can also be carried out to attach semantic attributes to them (S205). Next, morphemes and fixed morpheme phrases with semantic attributes as well as special parses can be selected as keyword candidates (S206). The list of selected keyword candidates can then be outputted to the keyword candidate selection unit 15 (S207).

Figure 6:
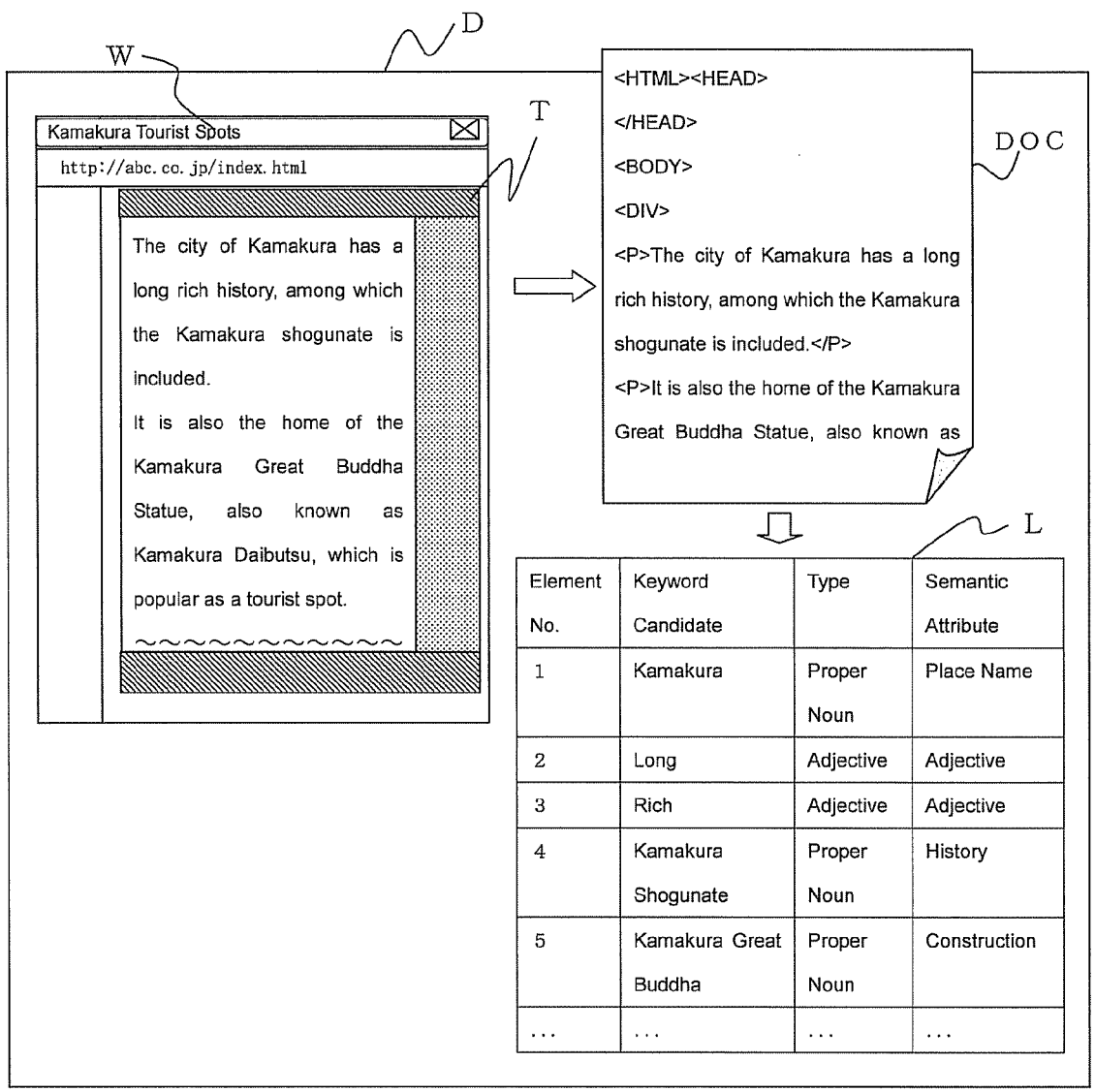
FIG. 6 is a diagram illustrating the keyword candidate list created by the Keyword Candidate Extraction Unit 12 in S104.

FIG. 6 shows an example of a keyword list L extracted from the DOC shown in FIG. 4. In the case of L, proper nouns and adjectives are selected as keyword candidates. As shown in FIG. 6, the proper noun "Kamakura" with the semantic attribute "Place Name", the adjectives "Long" and "Rich" with the semantic attribute "Adjectives, the proper noun "Kamakura Shogunate" with the semantic attribute "History" and the proper noun "Kamakura Great Buddha" with the semantic attribute "Construction" are chosen. A column is added to the left most side of L to record the number of elements (Element No.) in L.

Next, act S105 of FIG. 2 is explained in greater detail.

Figure 7:
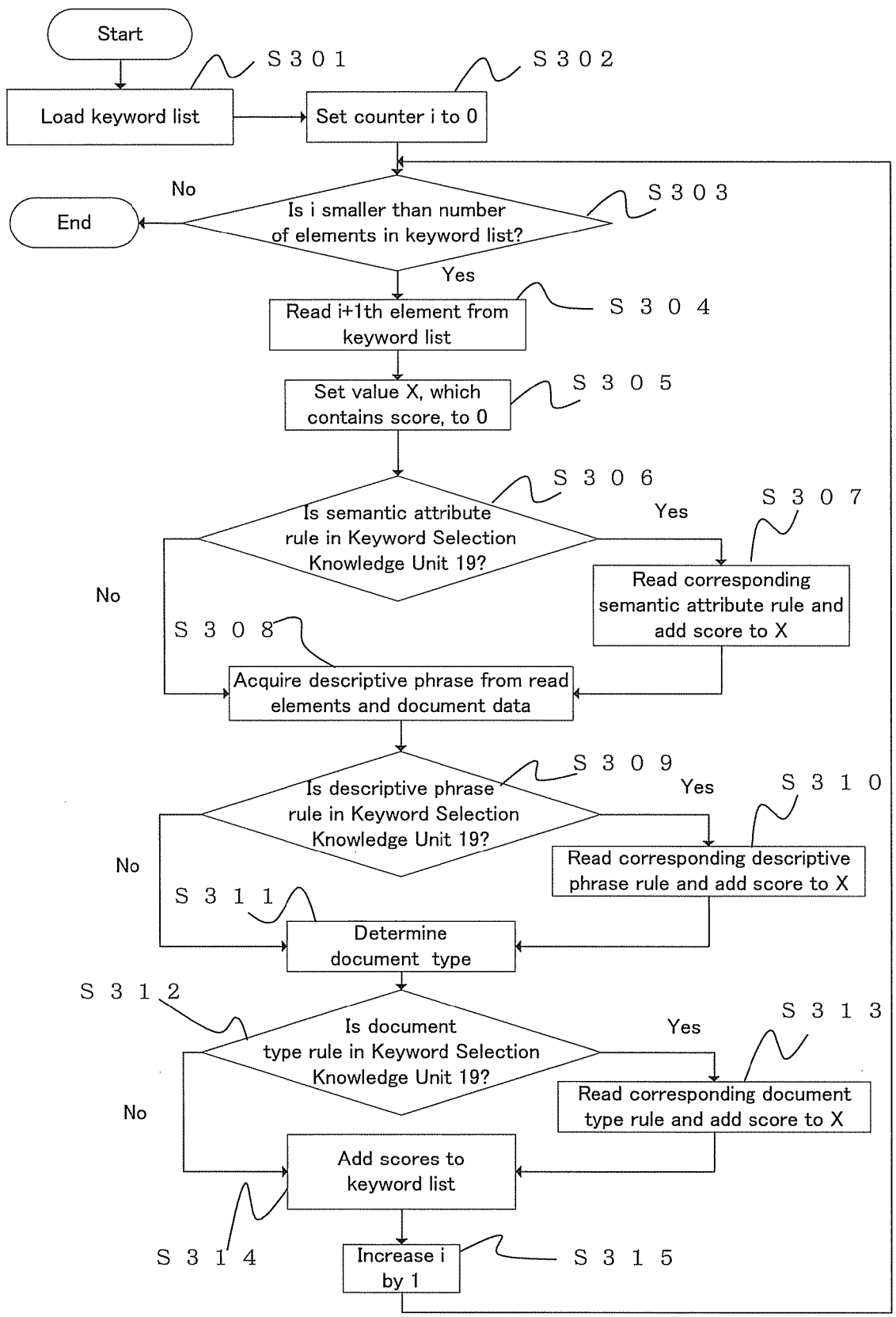
FIG. 7 is a diagram illustrating the flow of the keyword candidate process carried out by the Keyword Candidate Selection Unit 15 in S105.

Keyword candidate selection unit 15 evaluates the keyword candidates extracted by the keyword candidate extraction unit 12 and determines the suitability to display video data as related information. The flow of the evaluation process is explained in FIG. 7. The keyword candidate list is first loaded up (S301) and the counter value i is set to 0 (S302). A check is then carried out to check if the counter value i is smaller than the number of elements contained within the keyword candidate list (S303). If the counter value i is greater than the number of elements, then the process is ended. If the counter value i is smaller than the number of elements in the list, then the (i+1)th element is read from the keyword candidate list (S304). The value X containing the score is then set to 0 (S305).

Next, a check is carried out to find out if the semantic attribute of the read element belongs to a semantic attribute rule that exists in the keyword candidate selection knowledge unit 19 (S306). If the semantic attribute rule does not exist, then descriptive phrases related to the element can be acquired from the document data by the descriptive phrase acquisition unit 16 (S308). If the semantic attribute rule exists, then the corresponding semantic attribute rule can be read and the score would be added to the value X (S307) before descriptive phrases related to the element are acquired (S308).

A check is then carried out find out if the descriptive phrases related to the read element belongs to a descriptive phrase rule that exists in the keyword candidate selection knowledge unit 19 (S309). If the descriptive phrase rule does not exist, then the document type of the document containing the element would be determined by the document type determination unit 18 (S311). If the descriptive phrase rule exists, then the corresponding descriptive phrase rule would be read and the score would be added to the value X (S310) before the document type is determined (S311).

Next, a check can be carried out to find out if the document type belongs to a document type rule that exists in the keyword candidate selection knowledge unit 19 (S312). If the document type rule does not exist, then the scores can then be added to the keyword candidate list (S314) before the value of i is increased by 1 (S315). If the document type rule exists, then the corresponding document type rule can be read and the score can be added to the value X (S313) before the scores are added to the keyword candidate list (S314). The value of i can also be increased by, for example, 1 here (S315) before the process is looped back to check if the value i is smaller than the number of elements in the keyword candidate list.

The above 3 scores are obtained from the semantic attribute rules, descriptive phrase rules, and document type rules stored in keyword candidate selection knowledge unit 19.

FIGS. 8A, 8B and 8C illustrate the rules stored within the keyword candidate selection knowledge unit 19. In FIG. 8A, semantic attributes and their respective scores which make up the semantic attribute rules are shown. In this example, as depicting animals in a dynamic environment and showing the movement is important, the semantic attribute "Animal" is accorded a score of 15. However, as buildings do not move, showing movement though video may not be necessary, thus leading to the semantic attribute "Construction" having a score of 4. As the semantic attribute "Verb" has too wide a meaning, it is accorded a score of 2. In FIG. 8B, descriptive phrases and their respective scores which make up the descriptive phrase rules are shown. In this example, the user is assumed to have an interest in the descriptive phrases "Long", "Rich" and "Popular", thus leading them to have a score of 10. On the other hand, the user is assumed to be disinterested in the descriptive phrase "Awe-inspiring", thus it is given a score of 2. In FIG. 8C, document types and their respective scores which make up the document type rules are shown. In this example, the user is assumed to have an interest in the document type "News" with the semantic attribute "People Name", thus it has a score of 5. However, the user is not interested in "News" with the semantic attribute "Place Name", thus it is given a score of −3. In this example, the semantic attributes and descriptive phrases have fixed scores, but the scores for document types would be adjusted by its corresponding semantic attribute.

Next, act S106 of FIG. 2 is explained in greater detail.

Figure 9:
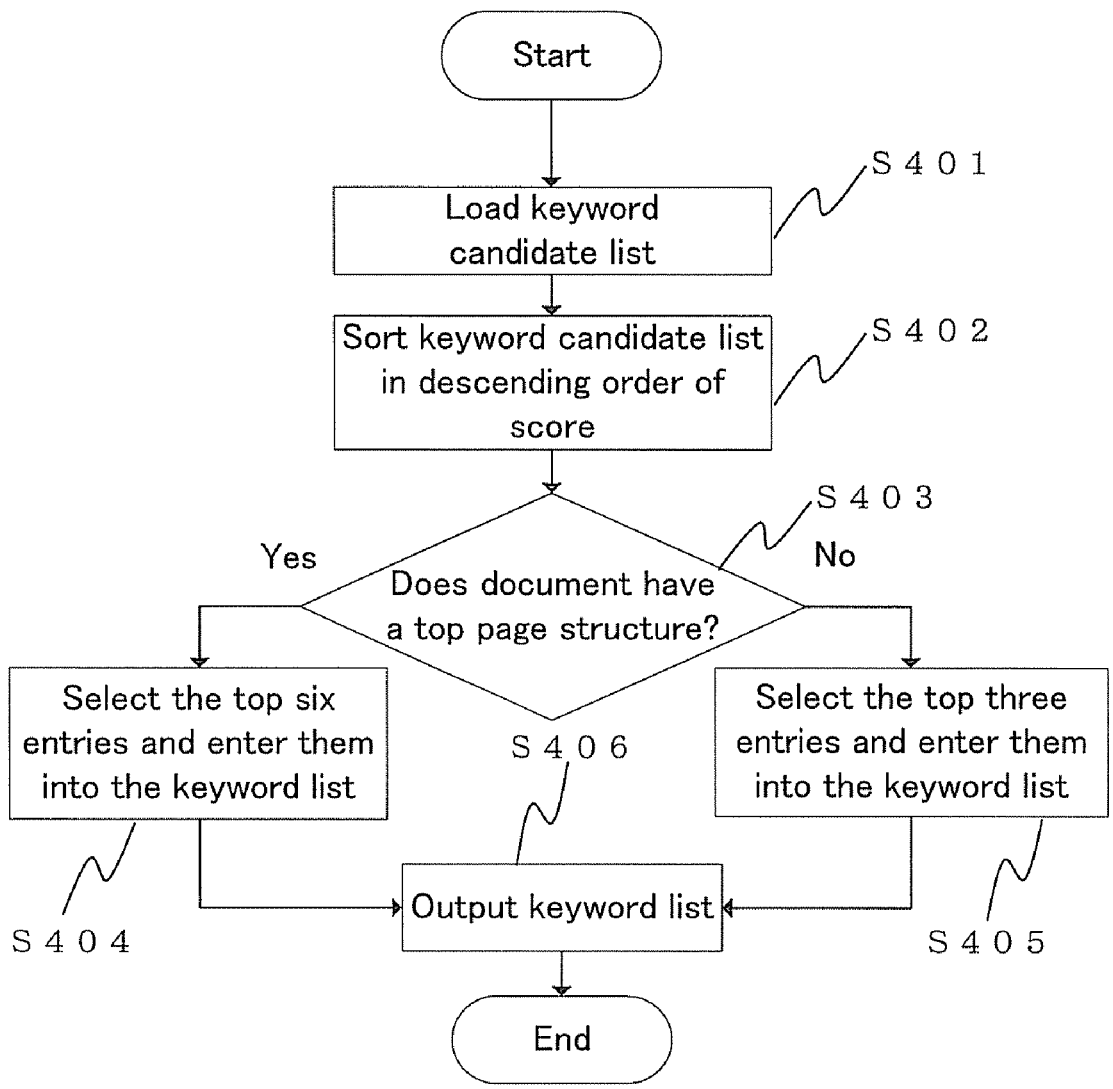
FIG. 9 is a diagram illustrating the flow of the keyword list creation process as carried out by the Keyword Candidate Selection Unit 15 in S106.

The detailed flow of the keyword selection process is shown in FIG. 9. In FIG. 9, the document data structure is utilized. Basically, the webpage being viewed is simplified into a top page type structure or a non top page type structure. The keyword candidate list is first loaded up (S401). The list is then sorted in a descending order based on the score (S402). Next, a check is carried out to determine if the document has a top page type of structure (S403). If the document has a top page type of structure, then the top six entries in the keyword candidate list are selected and entered into the keyword list (S404) before the list is outputted (S406). If the document has a non top page type of structure, then the top three entries in the keyword candidate list are selected and entered into the keyword list (S405). The list is then outputted (S406) before the whole process is ended. In the case of the top page type structure, the top six entries are chosen so as to increase the number of topics searched as top page type structures usually have many topics shown thereon in the form of an index page.

Figure 10:
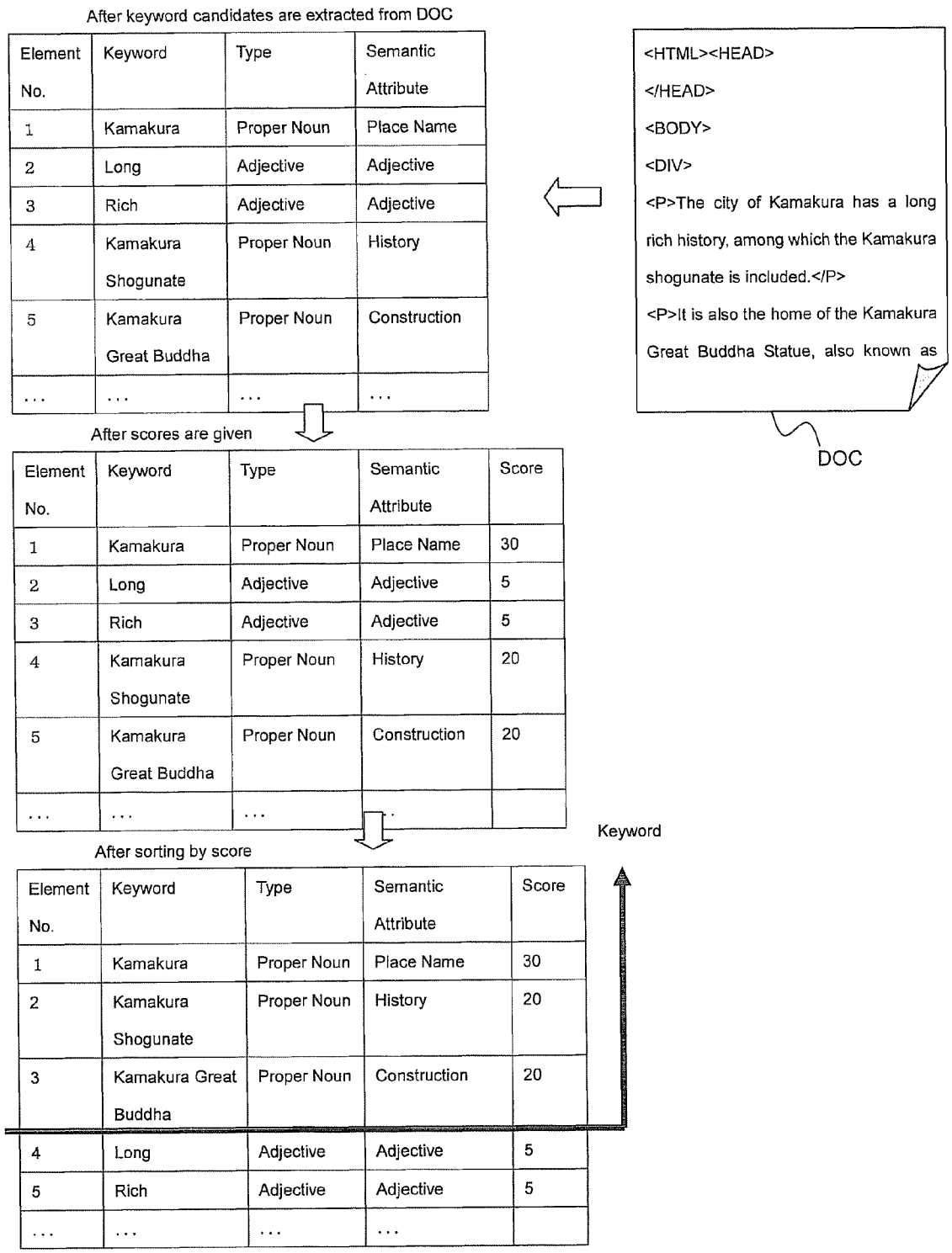
FIG. 10 is a diagram illustrating the created keyword list.

FIG. 10 shows the keywords selected from the keyword candidate list shown in FIG. 6. First, a keyword candidate list is created after keyword candidates are extracted from DOC as shown in FIG. 10. Next, the keywords are evaluated and scored by the process shown in FIG. 7. The scores are added to the keyword list as shown in FIG. 10. Lastly, the list is sorted in descending order as shown by the process in FIG. 9. The top three entries are chosen as keywords as shown by the process in FIG. 10 as the document is considered to be of a non top page type. In this case, the top three keywords are "Kamakura", "Kamakura Shogunate" and "Kamakura Great Buddha".

Figure 11:
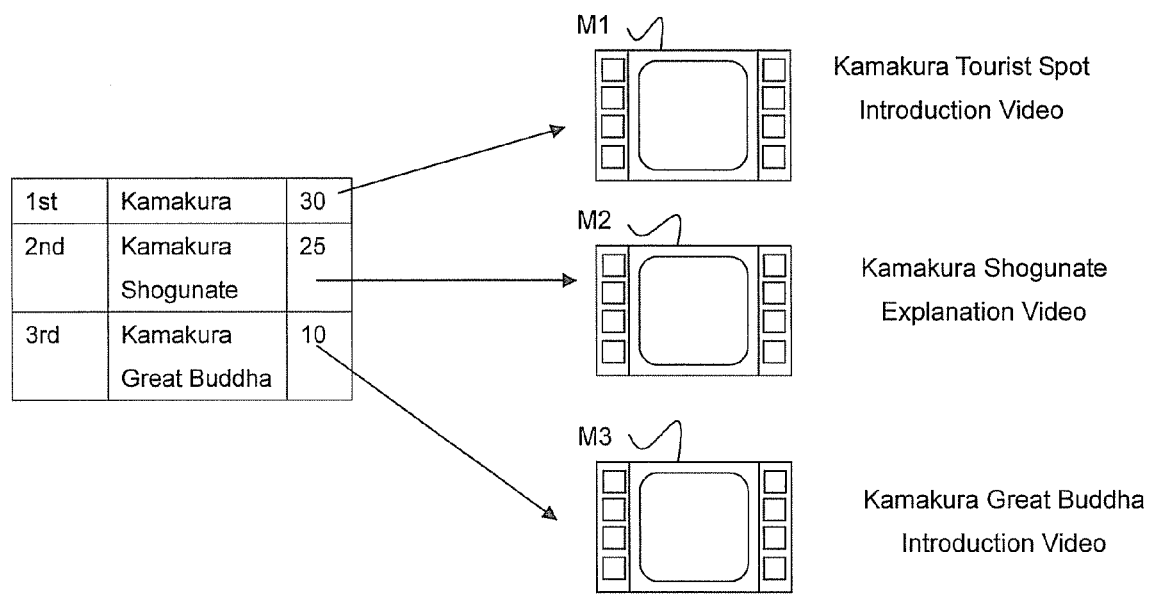
FIG. 11 is a diagram illustrating the image displayed after a search is carried out by the Related Information Search Unit 20 in S107.

The video clips found as related information by the related information search unit 20 are displayed as shown in FIG. 11. A video search conducted on the three keywords chosen in FIG. 10 and each has a corresponding video clip M1, M2 and M3 found.

Next, act S107 of FIG. 2 is explained in greater detail.

Figure 12:
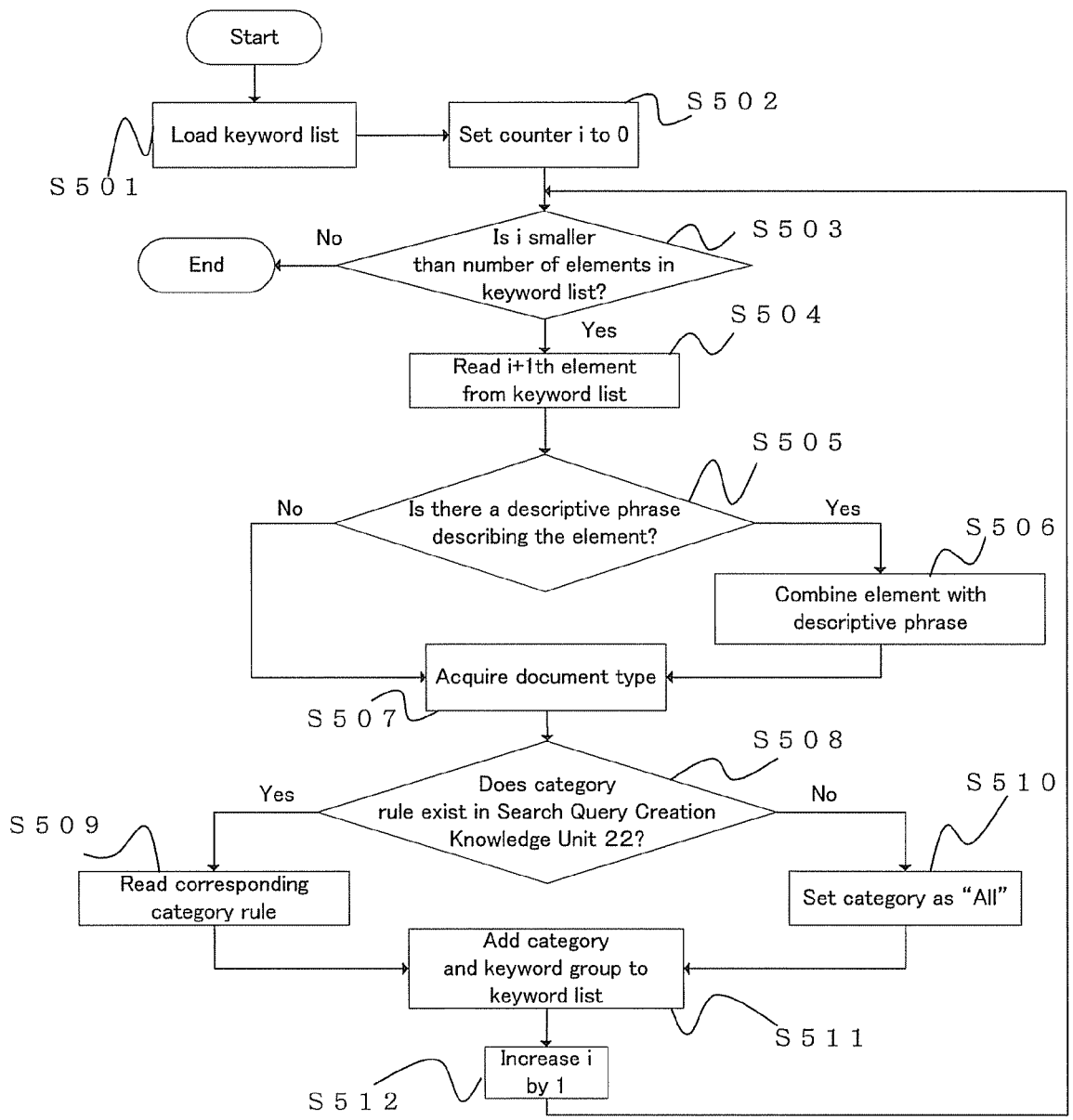
FIG. 12 is a diagram illustrating the flow of the search query creation process as carried out by the Search Query Creation Unit 21 in S107.

The search query creation unit 21 appends information to the selected keywords to create search queries. The flow for the creation of search queries is shown in FIG. 12. First, the keyword list is loaded (S501) and the counter value i is set to 0 (S502). A check is then carried out to check if the counter value i is smaller than the number of elements contained within the keyword list (S503). If the counter value i is greater than the number of elements, then the process is ended. If the counter value i is smaller than the number of elements in the list, then the (i+1)th element is read from the keyword list (S504).

A check is then carried out find out if there is descriptive phrase related to the read element (S505). If there is no descriptive phrase describing the element, then the document type of the document containing the element can be determined by the document type determination unit 18 (S507). If the descriptive phrase describing the element exists, then the corresponding descriptive phrase can be combined with the element (S506) before document type determination unit 18 determines the document type (S507).

Next, a check can be carried out to find out if the category creation rule containing the document type exists in the search query creation knowledge unit 22 (S508). If the category creation rule does not exist, then the category can be set to "All" (S510) before the category and keyword group is added to the keyword list (S511). If the category creation rule exists, then the corresponding category creation rule can be read and the category can be set accordingly (S509) before the category and keyword group is added to the keyword list (S511). The value of i would then be increased by 1 (S512) before the process is looped back to check if the value i is smaller than the number of elements in the keyword list.

FIG. 13 shows an example of the selected keywords and the respective categories as created by the search query creation unit 21. In this example, as "Kamakura" is a place name, the category is set to "Travel". As "Kamakura Shogunate" and "Kamakura Great Buddha" are proper nouns related to specific things, the categories are set to "Documentary".

FIG. 14 shows an example of the category creation rule. In this example, the video category changes according to the semantic attributes and document types. For document type "News", the video category can be set to "News" regardless of the semantic attribute. However, for the document type "Tourist Spot", the video category can be set to "Documentary" in the case of the semantic attribute being "History", while the video category can be "Travel" if the semantic attribute were to be "Place Name". In the event that the document type was to be "Recipe" and the semantic attribute "People Name", the video category can be set to "Restaurant".

Figure 15:
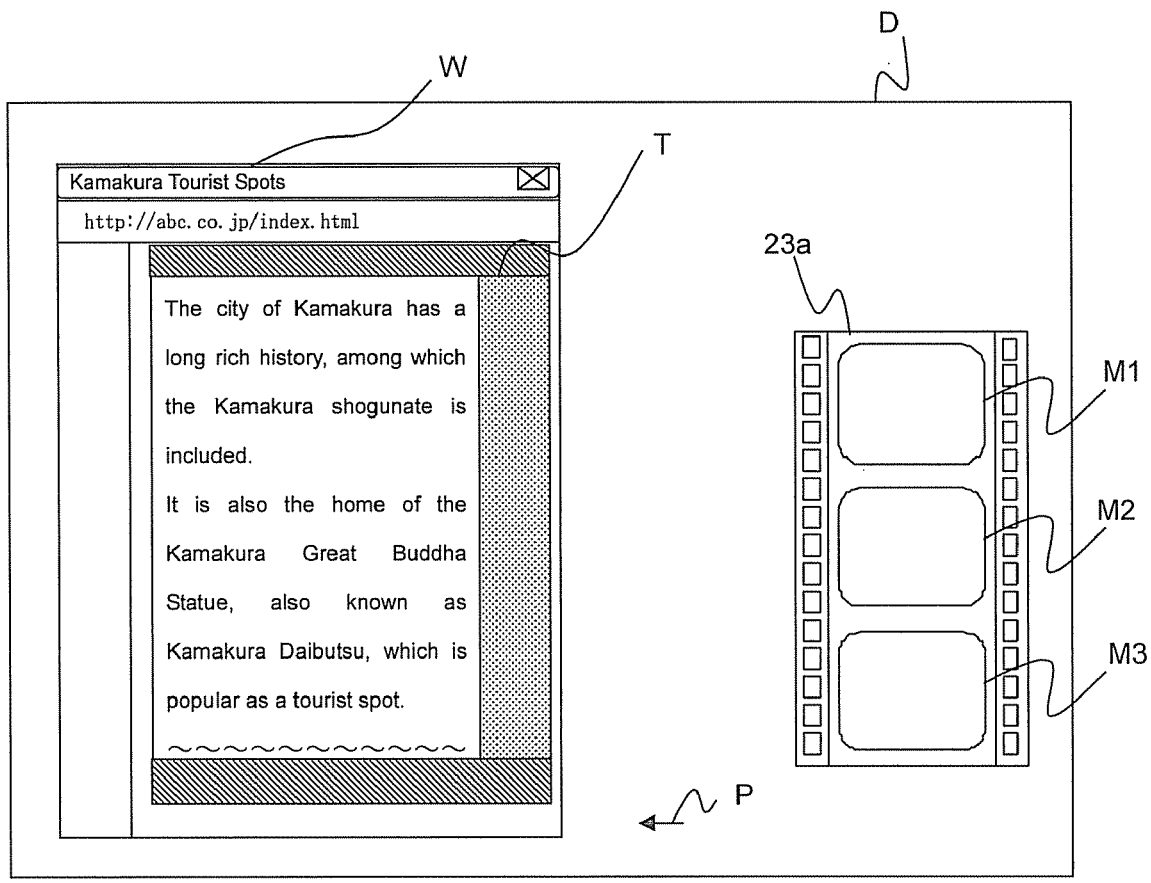
FIG. 15 is a diagram illustrating a method of presenting the recommended information through the Related Information Display Control Unit 23 in a first embodiment of the present invention.

The related information display control unit 23 can display the related information obtained by the related information search unit 20 on the display unit 10. FIG. 15 shows an example of such a display. In FIG. 15, the web browser W is shown alongside the related information display gadget 23*a* on the client display unit or monitor D. Display gadget 23*a* displays related information M1, M2 and M3 wherein each is related to a different keyword. The contents of M1, M2 and M3 can change automatically in response to the changes in the webpage T shown in window W. The cursor P can be used to click on M1, M2 and M3 to select it and play the contents in an enlarged window.

Figure 16:
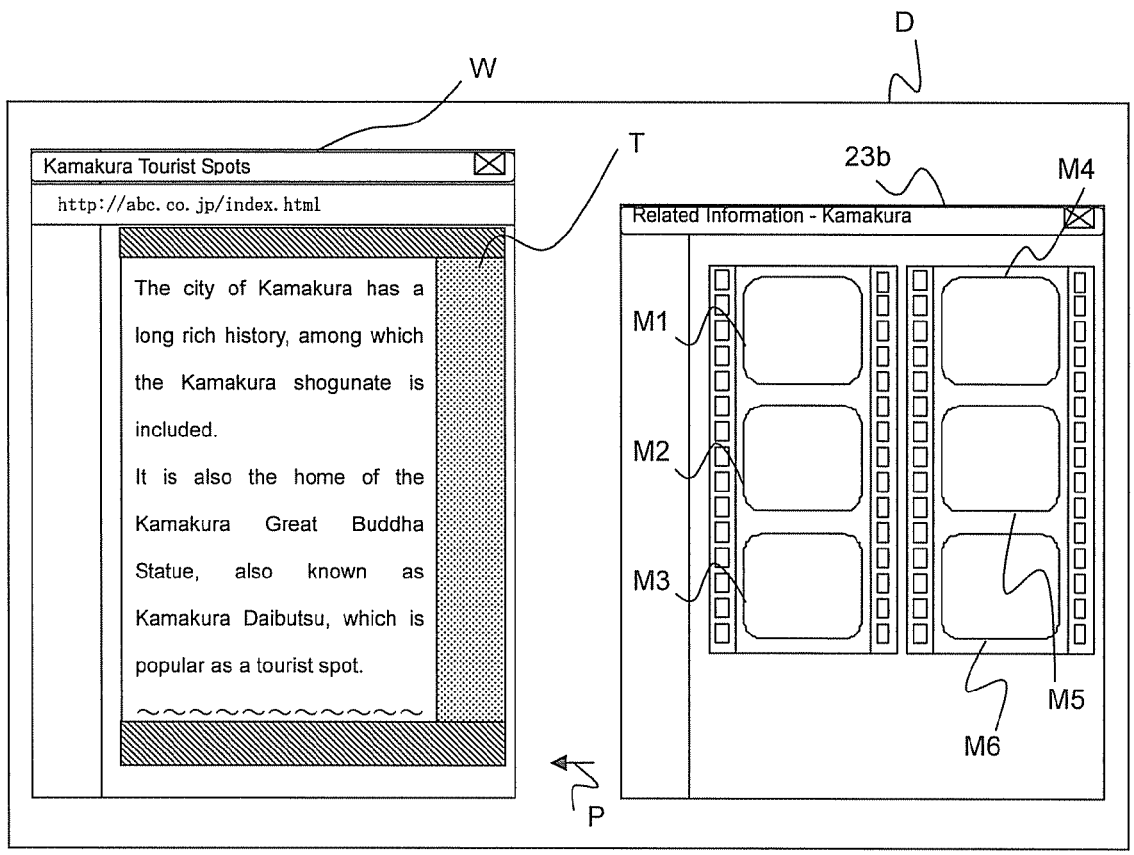
FIG. 16 is a diagram illustrating a method of presenting the recommended information through the Related Information Display Control Unit 23 in a second embodiment of the present invention.

However, the display method of the present invention is not limited to the one shown in FIG. 15. For example, as seen in the second embodiment of the display method in FIG. 16, if the browsing of the webpage T were to be ended and window W closed, then it can be possible to group all the related information and display it in one single summary window 23*b*.

Figure 17:
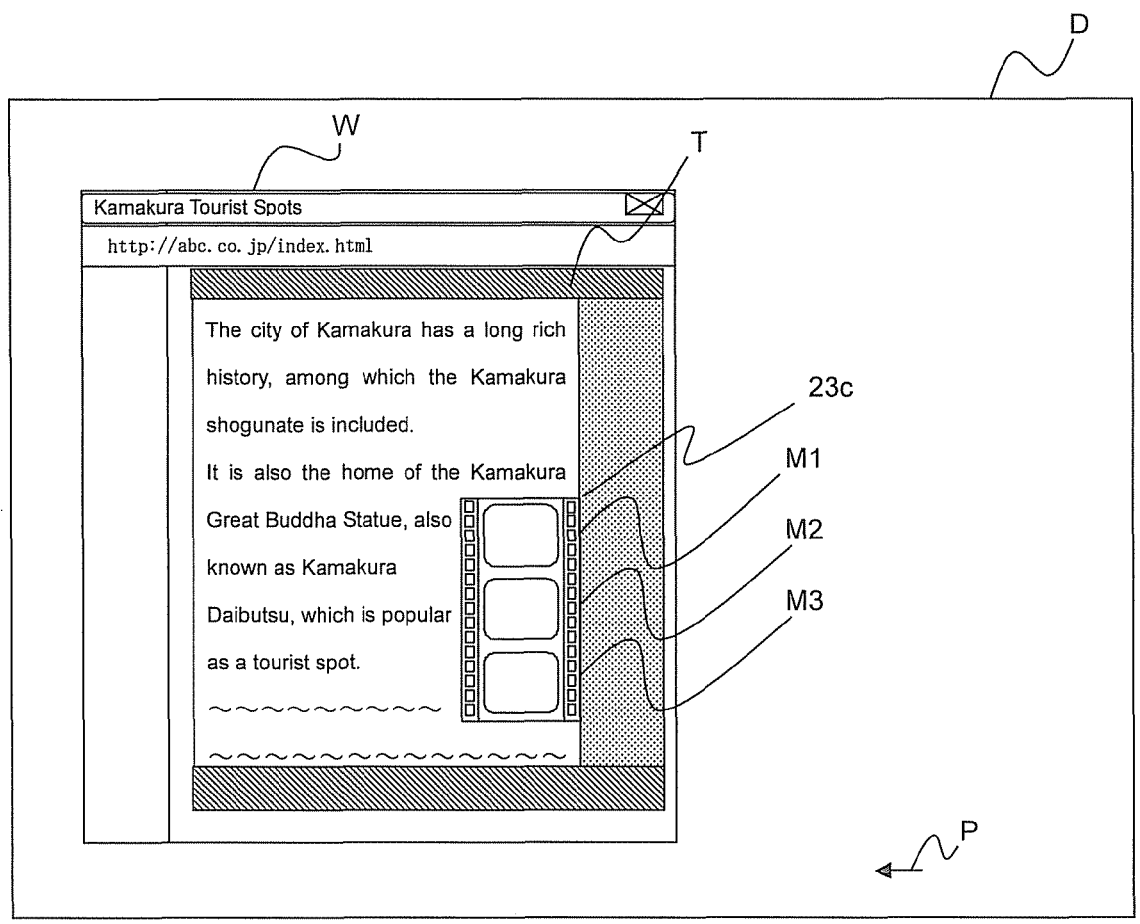
FIG. 17 is a diagram illustrating a method of presenting the recommended information through the Related Information Display Control Unit 23 in a third embodiment of the present invention.

A third embodiment of the display method is depicted in FIG. 17, wherein the related information M1, M2 and M3 are displayed in the blank spaces found on the webpage in a single block 23*c*.

Figure 18:
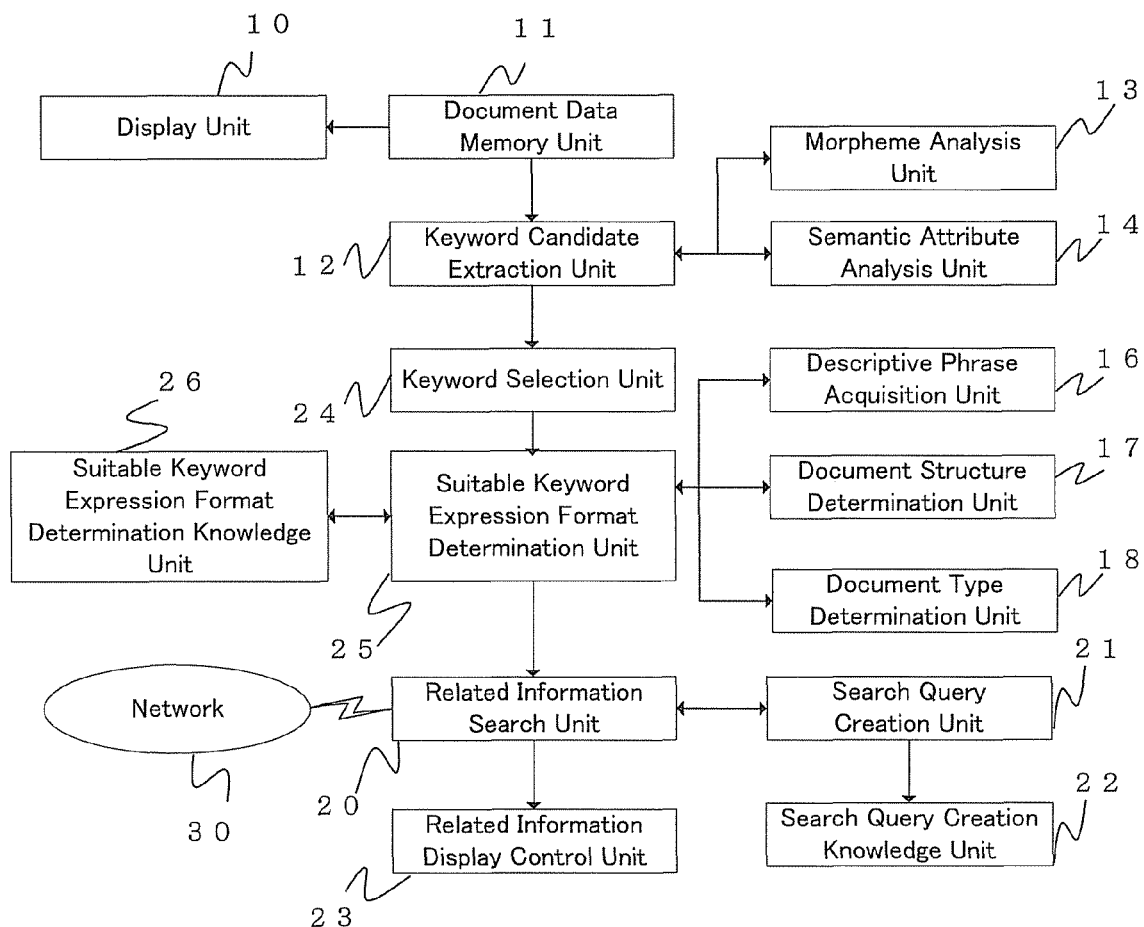
FIG. 18 is a functional block diagram illustrating a fourth embodiment of the recommended information presentation apparatus of the present invention.

FIG. 18 shows the functional block diagram of a fourth embodiment of the present invention. In this embodiment, the functional blocks are essentially the same as FIG. 1. However, in place of the keyword candidate selection unit 15 and the keyword candidate selection knowledge unit 19, the keyword selection unit 24, the suitable keyword expression format determination unit 25 and the suitable keyword expression format determination knowledge unit 26 are added. The keyword selection unit 24 evaluates the importance of each keyword candidate with respect to the document data contents and selects keywords for which related information is to be obtained. The evaluation criteria can be based on things such as the number of times the keyword candidate has appeared or the positioning of the keyword candidate in the document. The suitable keyword expression format determination unit 25 then determines the suitable expression format for the related information to be found with regards to the selected keyword. The determination process uses descriptive phrases obtained from the descriptive phrase acquisition unit 16, document structure obtained from the document structure determination unit 17 or document type obtained from the document type determination unit as well as the rules stored in the suitable keyword expression format determination knowledge unit 26. Once the suitable expression format is determines, a search for related information is carried out by the related information search unit 20.

FIG. 19 shows an example of the keyword list with the suitable expression format for related information added in. Each keyword is associated with a suitable expression format. Next, either a search query is then created by the search query creation unit 21 or a search method for related information is determined by the related information search unit 20. Examples of search methods include video searches, still image searches, webpage searches, thesis searches, book searches, etc. In this example, in order to introduce the place "Kamakura", the suitable expression format is set to "Video". As "Kamakura Shogunate" is a phrase that is quite academic in nature, the suitable expression format is set to "Text". Lastly, since the "Kamakura Great Buddha" is a famous construct, the suitable expression format is set to "Still Image".

FIG. 20 shows an example of the rules stored in the suitable keyword expression format determination knowledge unit 26. one one hand, if the descriptive phrases accompanying a certain keyword are related to visuals, then the most suitable expression format can be set to either still images or videos. On the other hand, if a relatively unknown or unfamiliar word is chosen as the keyword, or if the surrounding text does not seem to provide adequate explanation, then the suitable expression format can be set to text in order to better explain the selected keyword. For example, for the document type "Tourist Spot" with the surrounding phrase "Therapeutic" and keyword semantic attribute "Place Name", the suitable expression format can be set to "Video". For the document type "Tourist Spot" with the surrounding phrase "Awe-inspiring" and keyword semantic attribute "Construction", the suitable expression format can be set to "Still Image".

Figure 21:
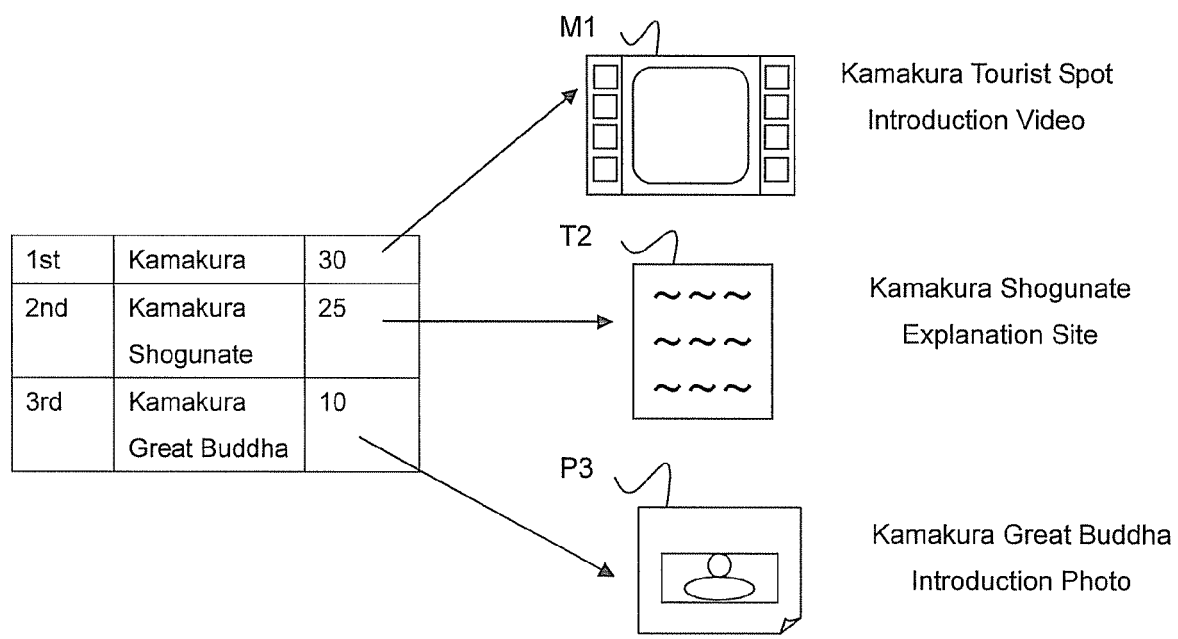
FIG. 21 is a diagram illustrating the image displayed after different expression formats are chosen.

The related information found by the related information search unit 20 is displayed as shown in FIG. 21. A video search conducted on the three keywords chosen in FIG. 10 and each has a corresponding piece of related information found, namely, M1, P2 and T3. This allows the expression format to change according to the contents of the document. For example, in response to the keyword "Kamakura", an introduction video of Kamakura tourist spots would be offered. For the keyword "Kamakura Shogunate", the user is assumed to be interested in finding out more about that time period, thus an explanation site on the Kamakura Shogunate can be offered. For the keyword "Kamakura Great Buddha", a photo introducing this famous statue can be offered up.

Figure 22:
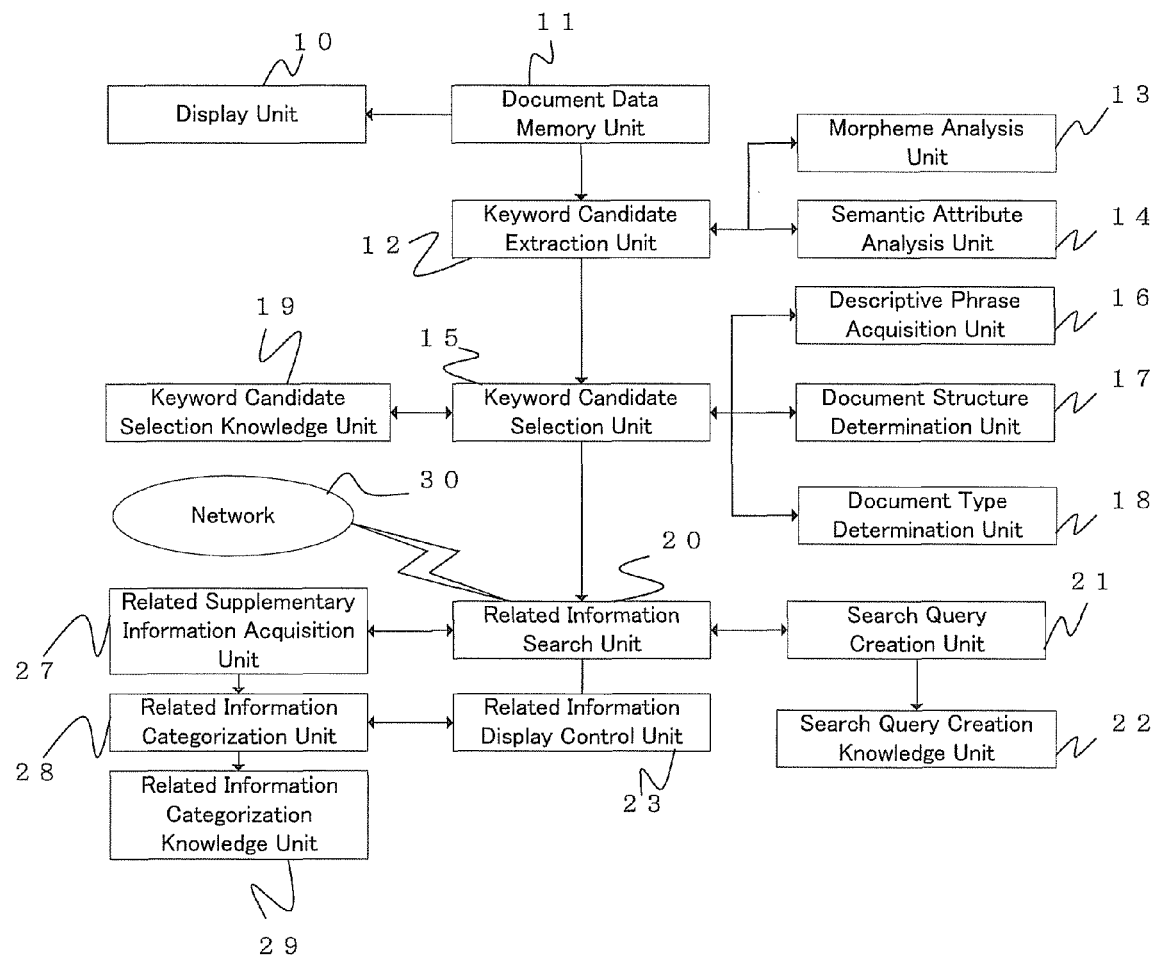
FIG. 22 is a functional block diagram illustrating a fifth embodiment of the recommended information presentation apparatus of the present invention.

FIG. 22 shows the functional block diagram of a fifth embodiment of the present invention. In this embodiment, the functional blocks are essentially the same as FIG. 1. However, the related supplementary information acquisition unit 27, the related information categorization unit 28 and the related information categorization knowledge unit 29 are added. We are referring to information that can help arrange or supplement the related information when the term related supplementary information is used. In the event of video data, examples of related supplementary information can be things such as video titles, video content summaries, commentaries and content explanations. In the event that we are looking at a news article, the supplementary information can be items like article title, author and the website category.

The related information categorization unit 28 can utilize the related supplementary information obtained by the related supplementary information acquisition unit 27 from the related information search unit to classify the related information. This categorization process is based on the rules stored in the related information categorization knowledge unit 29. The classified information is then displayed on the display unit 10 by the related information display control unit 23. The categorization criteria for video data can be based on things such as the descriptive phrases and user scores which can be obtained by the related supplementary information acquisition unit 27 from the user comments or tag information. By classifying the related information, the user can view all of the information in an index, as such; being able to choose the files they desire to view. This can save them the hassle of viewing all the files, especially in the case of time consuming video files.

Figure 23:
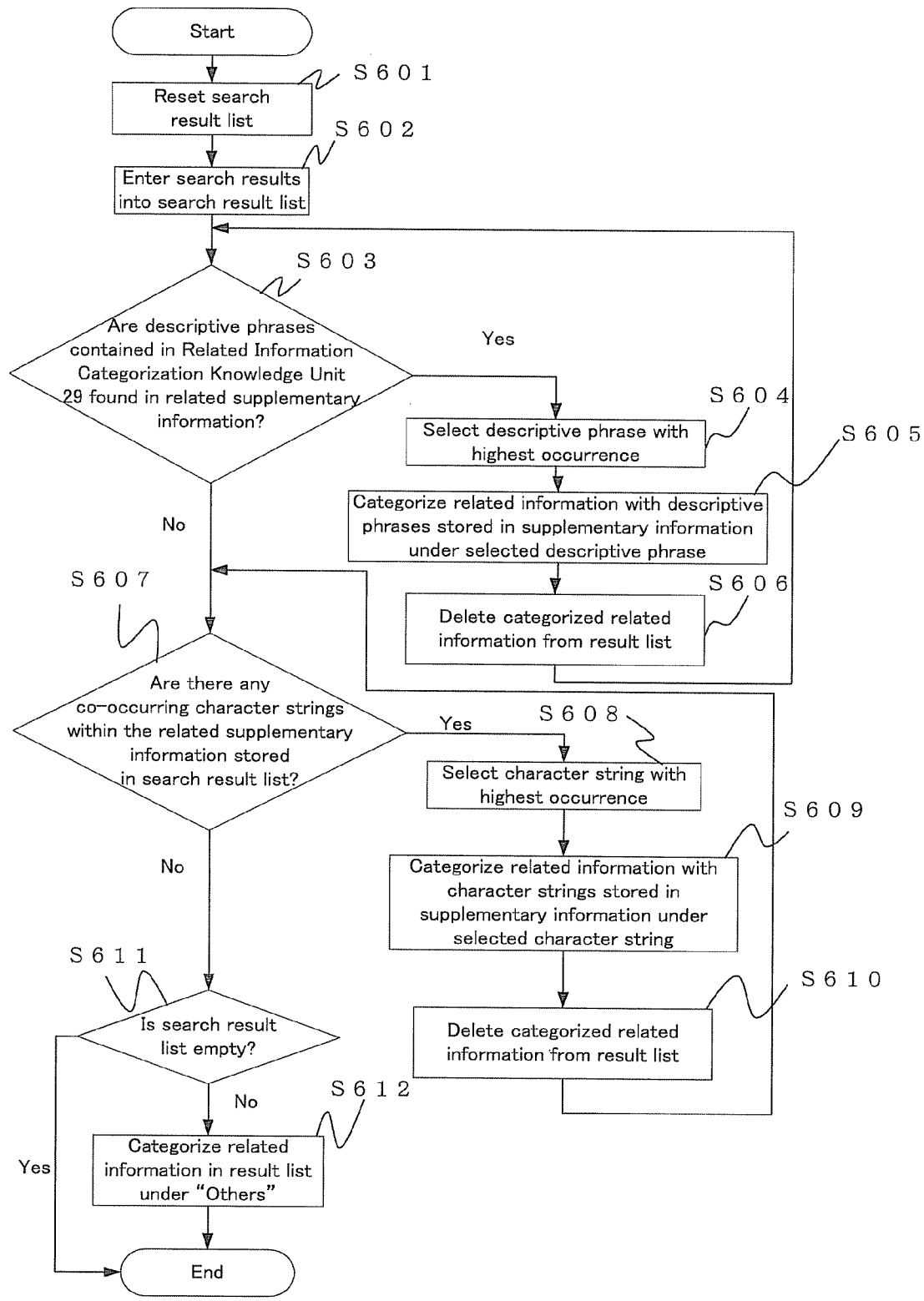
FIG. 23 is a diagram illustrating the flow carried out by the Related Information Categorization Unit 28.

FIG. 23 shows the flow of the related information categorization process as carried out by the related information categorization unit 28. First, the search result list is reset to its default (S601) and the search results obtained are entered into the search result list (S602). Next, a check is carried out to find out if the descriptive phrases contained in the related information categorization knowledge unit 29 is also found in the related supplementary information (S603). If the descriptive phrases are found in the related supplementary information, then the descriptive phrase with the highest number of occurrences can be selected (S604). Next, the related information with the selected descriptive phrase found in its supplementary information can be classified under the heading of the selected descriptive phrase (S605). The categorized related information can then be deleted from the result list (S606) before the process is looped back to find out if the descriptive phrases contained in the related information categorization knowledge unit 29 is also found in the related supplementary information.

If the descriptive phrases are not found in the related supplementary information, a check can be carried out to check if there are any character strings which have appeared more than once within the related supplementary information stored in the search result list (S607). If such character strings are found, the character string with the highest number of occurrences can be selected (S608). Next, the related information with the selected character string found in its supplementary information can be classified under the heading of the selected character string (S609). The categorized related information can then be deleted from the result list (S610) before the process is looped back to find out if the descriptive phrases contained in the related information categorization knowledge unit 29 is also found in the related supplementary information.

If such character strings are not found, then a check can then be carried out find out if the search result list is empty (S611). If the search result list is empty, then the process can be ended immediately. If the search result list is not empty, then the related information in it can be categorized under the category heading of "Others" (S612) before the process is ended.

Figure 24:
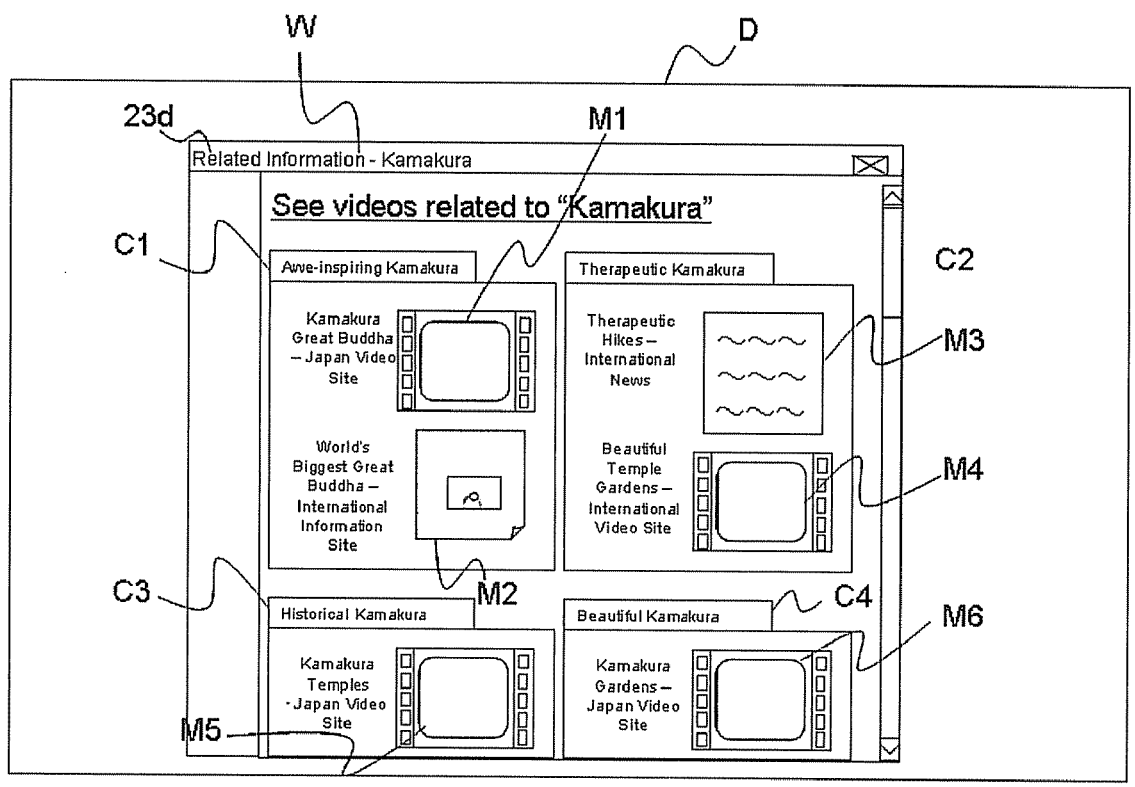
FIG. 24 is a diagram illustrating the display of related supplementary information in a separate window as shown in 23d.

FIG. 24 gives an example of how the categorized related information can be displayed. In this example, the related information M1, P2, T3, M4, M5 and M6 can be displayed in related information display window 23d. The related supplementary information can be extracted from the comments and document tags. Such examples include the descriptive phrases "Awe-inspiring" and "Therapeutic". The related information can then be categorized into categories C1-C4. For the category "Awe-inspiring Kamakura", the videos "Kamakura Great Buddha" and "World's Biggest Great Buddha" can be shown. The text information "Therapeutic Hikes" and the video "Beautiful Temple Gardens" can be shown under the category "Therapeutic Kamakura". Such information can be gleaned from various sources like Japan video sites or international news sites.

As used in this application, the terms "component", "unit", and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art recognize many modifications may be made to this configuration without departing from the scope or spirit of the claimed subject matter.

While the subject matter is described above in the general context of computer-executable instructions of a computer program that runs on a computer and/or computers, those skilled in the art recognize that the innovation also may be implemented in combination with other program modules. Generally, program modules include routines, programs, components, data structures, and the like, which perform particular tasks and/or implement particular abstract data types. Moreover, those skilled in the art appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recommended information presentation apparatus, comprising:
   a memory; and
   a processor that executes the following computer-executable components within the memory:
      a display unit configured to display text data;
      an extraction unit configured to extract keyword candidates from the text data;
      a storage unit configured to store semantic attributes of the keyword candidates, semantic attribute rules which contain scoring criteria for the semantic attributes, descriptive phrases extracted from the text data and describing the keyword candidates, and descriptive phrase rules which contain scoring criteria for the descriptive phrases based on respective determinations of interest in the descriptive phrases;
      a selection unit configured to calculate scores of the keyword candidates based on the semantic attribute rules and the descriptive phrase rules to select a selected keyword which has a highest score among the keyword candidates;
      a search unit configured to search an information database with the selected keyword and receive a search result; and
      a control unit configured to display the search result on the display unit as recommended information with regards to the text data.

2. The apparatus according to claim 1, further comprising:
   a text extraction unit configured to extract structured document data from the text data;
   wherein the storage unit is further configured to store a document type of the text data and document type rules which contain scoring criteria for respective combinations of the document type and respective semantic attributes.

3. The apparatus according to claim 1, wherein the storage unit is an externally attached unit configured to receive the keyword candidates from the extraction unit, score the keyword candidates to yield scored keyword candidates, and send the scored keyword candidates to the extraction unit.

4. The apparatus according to claim 1, wherein the selection unit is configured to select an expression format based on the keyword candidate.

5. The apparatus according to claim 1, further comprising:
   a supplementary information extraction unit configured to extract supplementary information of the keyword candidates by at least extraction of the descriptive phrases describing the keyword candidates from the text data, determination of document structures of the text data containing the keyword candidates, or determination of document types of the text data containing the keyword candidates.

6. The apparatus according to claim 1, wherein the extraction unit further comprises a semantic attribute analysis unit configured to analyzes the text data for character strings and obtain semantic attributes for the character strings.

7. The apparatus according to claim 5, wherein the search unit further comprises a search query creation unit configured to create a search query for a keyword of the keyword candidates based on at least one of a descriptive phrase describing the keyword and extracted from the text data by the supplementary information extraction unit, a document structure of the text data containing the keyword, or a document type of the text data containing the keyword.

8. The apparatus according to claim 1, further comprising:
   a related supplementary information acquisition unit configured to acquire supplementary information appended to related information; and
   a related information evaluation unit configured to evaluate a relevance of the related information to the text data based on the supplementary information.

9. The apparatus according to claim 8, further comprising:
   a related information categorization unit configured to categorize the related information based on the supplementary information.

10. A method for presenting recommended information, comprising:
    displaying text data on a display;
    extracting keyword candidates from the text data;
    storing, in a storing unit, semantic attributes of the keyword candidates, semantic attribute rules containing scoring criteria for the semantic attributes, descriptive phrases extracted from the text data and describing the keyword candidates, and descriptive phrase rules containing scoring criteria for descriptive phrases based on respective determinations of interest in the descriptive phrases;
    calculating scores of the keyword candidates based on the semantic attribute rules and the descriptive phrase rules;
    selecting a selected keyword of the keyword candidates having a highest score among the keyword candidates;
    searching an information database with the selected keyword and receiving a search result; and
    displaying the search result on the display as recommended information relating to the text information.

11. The method according to claim 10, wherein the extracting the keyword candidates from the text data comprises performing a morpheme analysis on the text data.

12. The method accord to claim 11, wherein the extracting the keyword candidates from the text data further comprises performing semantic attribute analysis.

13. The method according to claim 10, wherein the extracting the keyword candidates from the text data comprises dividing the text data into multiple character strings, and filtering the multiple character strings.

14. The method according to claim 10, wherein the calculating the scores of the keyword candidates based on the semantic attribute rules and the descriptive phrase rules comprises determining whether a document containing the text data has a top page type of structure.

15. The method according to claim 10, wherein the calculating the scores of the keyword candidates based on the semantic attribute rules and the descriptive phrase rules comprises determining whether a document containing the text data has a non top page type of structure.

16. The method according to claim 10, wherein the searching the information database with the selected keyword comprises at least one of searching for video, searching for a still image, searching for a webpage, searching for a thesis, or searching for a book.

17. The method according to claim 10, wherein the displaying the search result on the display comprises displaying the search result on a webpage in blank spaces in a single block.

18. The method according to claim 10, wherein the displaying the search result on the display comprises displaying the search result in a single summary window.

* * * * *